US006868197B1

(12) United States Patent
Daniels

(10) Patent No.: US 6,868,197 B1
(45) Date of Patent: Mar. 15, 2005

(54) CONNECTOR-LESS HIGH SPEED UNDERWATER DATA INTERFACE

(75) Inventor: Danny Daniels, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 104 days.

(21) Appl. No.: 10/354,708

(22) Filed: Jan. 28, 2003

(51) Int. Cl.[7] .............................. G02B 6/26; G02B 6/42
(52) U.S. Cl. ............................ 385/15; 385/27; 385/43
(58) Field of Search ............................. 385/15, 27, 43, 385/138; 398/128; 73/40; 250/216

(56) References Cited

U.S. PATENT DOCUMENTS

| 4,687,924 A | * | 8/1987 | Galvin et al. ............... 250/216 |
| 5,343,736 A | * | 9/1994 | Cady et al. .................... 73/40 |
| 5,726,786 A | * | 3/1998 | Heflinger .................... 398/128 |

* cited by examiner

Primary Examiner—Frank G. Font
Assistant Examiner—Mary El-Shammaa
(74) Attorney, Agent, or Firm—James T. Shepherd

(57) ABSTRACT

An interface assures high-speed transmission of optical data between submerged vessels. First and second vessels have pressure hulls and have a first plate transparent to optical data on the pressure hull of the first vessel and a second plate transparent to optical data on the pressure hull of the second vessel. A first optical transceiver in the first vessel is adjacent to the first transparent plate, and a second optical transceiver in the second vessel is adjacent to the second transparent plate. A layer of water between the first plate and the second plate is optically transparent to optical data to allow the first optical transceiver and the second optical transceiver to transmit and receive optical data through the first transparent plate, the water layer, and the second transparent plate.

15 Claims, 3 Drawing Sheets

US 6,868,197 B1

CONNECTOR-LESS HIGH SPEED UNDERWATER DATA INTERFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus for transferring data from one vessel to another. More particularly, this invention is to an interface to optically pass data underwater without using a separate connector or conduit for data that penetrates a pressure hull.

The current methods of transferring data between submersibles, submerged sensors/transponders of data, and other underwater packages usually rely on cables or connectors that physically penetrate the pressure hull. Typically, undersea vessels have pressure hulls that are strongly built to bear the crushing ambient pressures of deep water; however, the contemporary electrical or optical couplers tend to compromise the structural integrities of the submerged platforms where they penetrate the pressure hulls. Consequently, the capabilities and effectiveness of pressure hulls are limited as a consequence of the need to transfer data. Because of this limitation, some manned or unmanned submersibles must restrict their activities to shallower depths where meaningful data may not be collected as easily, and the risk of detection and more effective countermeasures may be greater.

Thus, in accordance with this inventive concept, a need has been recognized in the state of the art for an underwater data interface permitting high-speed optical transfer of data between submerged vessels without compromising structural integrity.

OBJECTS AND SUMMARY OF THE INVENTION

An object of the invention is to provide a high-speed optical data interface for use between submerged vessels.

Another object of the invention is to provide a high-speed optical data interface for use underwater that does not compromise the structural integrity of pressure hulls.

Another object of the invention is to provide a high-speed optical data interface transmitting through pressure vessels transparent to the data or optically transparent apertures.

Another object of the invention is to provide a high-speed interface transmitting data at high speed through a first optically clear aperture in one submerged vessel, a layer of ambient water, and a second optically clear aperture in another submerged vessel.

Another object of the invention is to provide a high-speed interface transmitting optical data at high speed through a thin layer of water between a first optical transceiver inside a first submerged hull optically transparent to the data and a second optical transceiver inside a second submerged hull optically transparent to the data.

Another object of the invention is to provide protrusions nestling in mating cavities on first and second optically clear plates to optically align the plates and assure optical transmission of optical data that is not refracted or otherwise distorted appreciably.

Another object is to provide a connector-less data interface requiring no cables, no special fixtures in place of connectors and no pressure hull penetrations to allow two underwater devices to exchange digital data at high speed.

These and other objects of the invention will become more readily apparent from the ensuing specification when taken in conjunction with the appended claims.

Accordingly, the present invention is to an interface for high-speed transmission of optical data between first and second submerged vessels. A first plate is transparent to optical data on the first vessel and a second plate is transparent to optical data on the second vessel. A first optical transceiver in the first vessel is adjacent to the first transparent plate, and a second optical transceiver in the second vessel is adjacent to the second transparent plate. A layer of water between the first plate and the second plate is optically transparent to optical data to allow the first optical transceiver and the second optical transceiver to transmit and receive optical data through the first transparent plate, the water layer, and the second transparent plates. The first transparent plate is an integral part of the pressure hull of the first vessel to create watertight integrity and a conduit of optical data, and the second transparent plate is an integral part of the pressure hull of the second vessel to create watertight integrity and a conduit of optical data.

DESCRIPTION OF THE PREFERRED EMBODIMENTS

Figure 1:
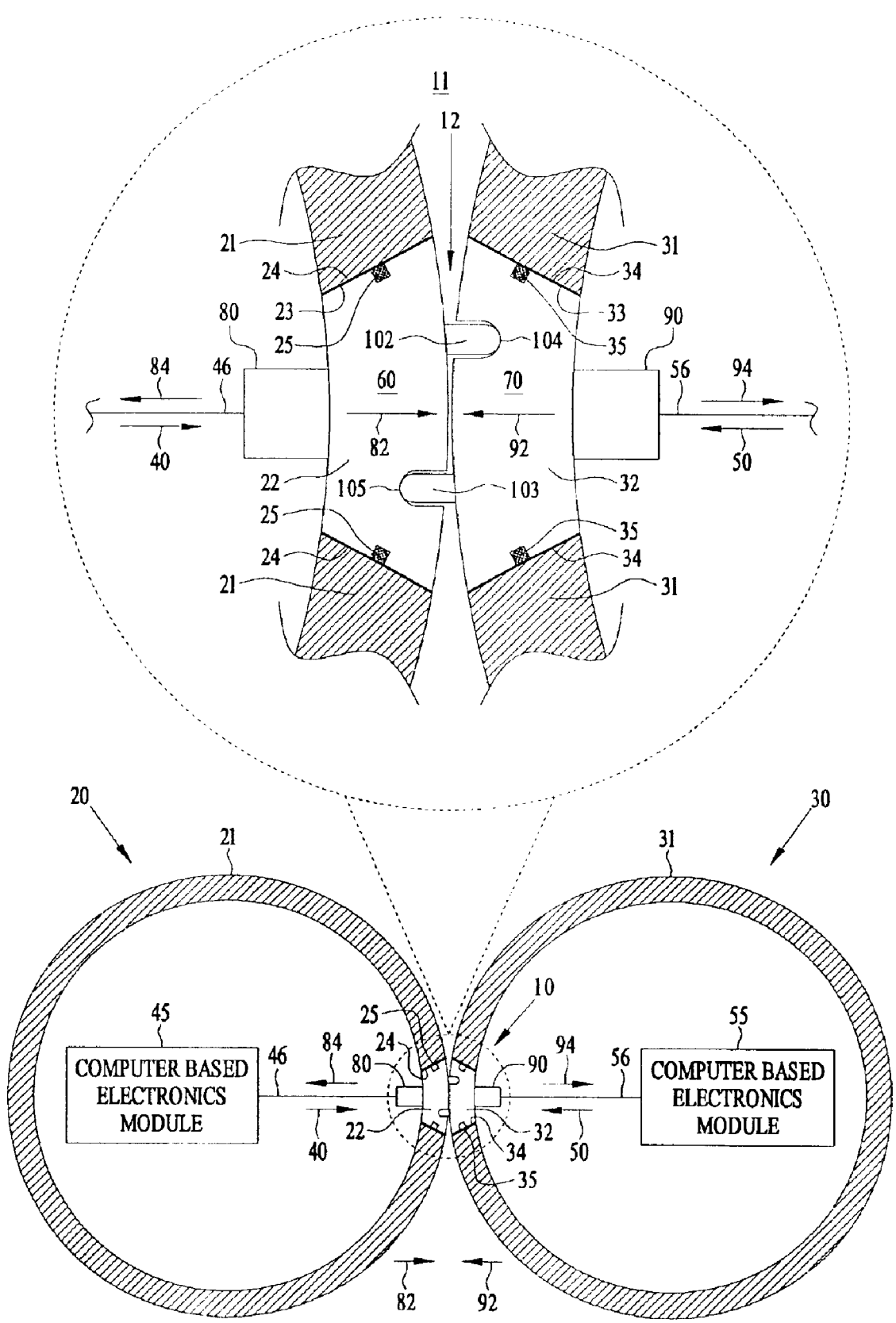
FIG. 1 is a schematic cross-sectional view of one embodiment of the underwater data interface of the invention showing an encircled blow-up of details for transmitting optical data between two submerged pressure vessels.

Referring to FIG. 1, an underwater data interface 10 of the invention is used to transmit and receive optical data between pressure vessels 20 and 30 submerged in water 11 without drawing attention to the process of transferring data. Pressure vessels 20, 30 can be any of many different submersibles, submerged data gathering vessels or transponders of data that can be deployed for unattended, attended, autonomous, or manned operation. Vessels 20, 30 protect crews and/or a wide variety of instrumentations from the hostile undersea environment, and they can have the capability of remaining submerged and on-station for prolonged operational periods.

Pressure vessels 20, 30 each can have a pressure hull 21, 31, robustly constructed from opaque, strong metals, such as steel and other high-strength alloys to bear the sometimes crushing ambient pressures created by ambient water 11. Pressure hulls 21, 31 can be made in cylindrical or spherical shapes for strength and can be made thicker and have internal bulkheads and bracing (not shown) to increase resistance to ambient pressures.

Underwater data interface 10 can transmit the information of electronic data signals (shown as arrow 40) from pressure vessel 20 to pressure vessel 30 or, correspondingly, the information of electronic data signals (shown as arrow 50)

from pressure vessel 30 to pressure vessel 20, or a combination of bidirectional transfers of the information of data signals 40, 50. Data signals 40 can come from a computer based electronics module 45 inside pressure vessel 20, and data signals 50 can come from a computer based electronics module 55 in pressure vessel 30. Electronics modules 45, 55 can include appropriate sources for data signals 40, 50, such as sensors of ambient phenomena, voice communications, relayed data, etc. Components for memory, storage, multiplexing, time compression, and other useful well known circuitry expedients can be included in electronics modules 45, 55 to handle, process, and transfer data signals 40, 50.

Underwater data interface 10 has curved optical plate members 60 and 70 that are made of a strong material transparent to optical data signals. Typical of such materials are some types of glass, clear polycarbonate, acrylic, or other sophisticated high-strength, rigid, plastic-like fabrication materials. Curved, or arc-shaped optical plate members 60 and 70 can be formed, or molded as arc-shaped sectors 22 and 32 of hulls 21 and 31 of vessels 20 and 30 that fit into correspondingly-shaped tapered openings 23 and 33 that extend coextensively in hulls 21 and 31. The arc-shaped sectors 22, 23 of plate members 60, 70 coextensively fitting into tapered openings 23, 33 in hulls 21, 31 provide strong joints that resist ambient pressures. Appropriate adhesives 24 and 34 and/or O-rings 25 and 35 can be included between arc-shaped sectors 22, 32 and tapered openings 23, 33 to secure and seal these junctures. Arc-shaped sectors 22, 32 serve as vital, integral parts of hulls 21, 31 that create watertight integrity of pressure vessels 20, 30. Arc-shaped sectors 22, 32 additionally function as conduits for optical data as described below.

Arc-shaped sectors 22, 32 of plate members 60, 70 have protrusions 102, 103 facing mating, correspondingly disposed cavities 104, 105 molded inwardly from and along their peripheries. Only one protrusion 102 and one cavity 105 for sector 22 and one protrusion 103 and one cavity 104 for sector 32 are shown, it being understood that many projections and cavities can be molded along the peripheries of arc-shaped sectors 22, 32. Protrusions 102, 103 nestle, or mate into cavities 104 105 when arc-shaped sectors 22, 32 are brought together to optically align and separate arc-shaped sectors 22, 32 and create layer 12 of water 11 in between. Light passing between vessels 20 and 30 through arc-shaped sectors 22, 32 is not refracted or otherwise distorted appreciably.

Figure 2:
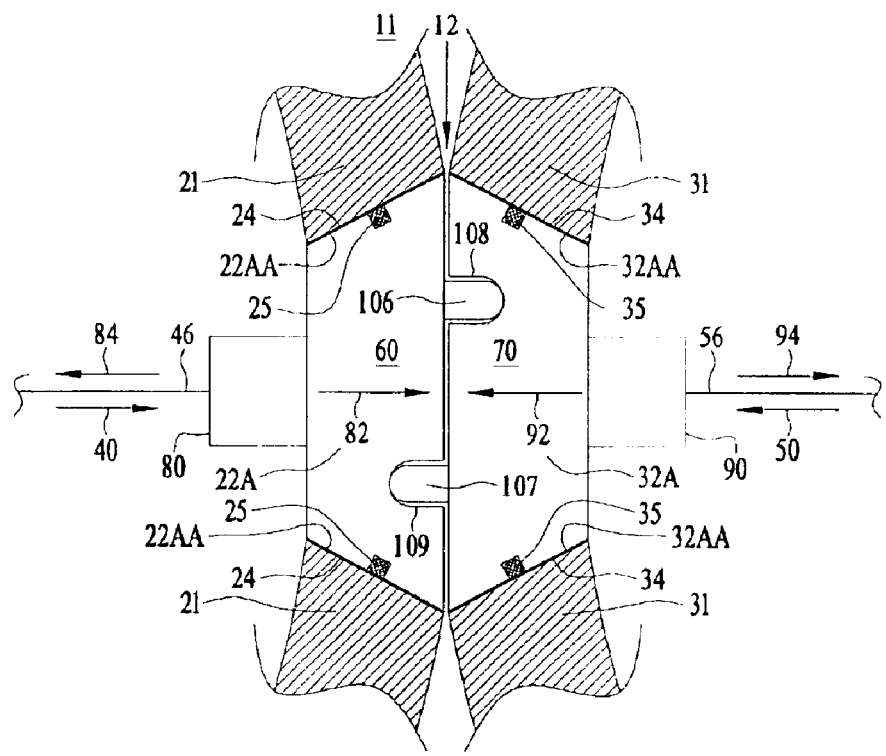
FIG. 2 is a schematic cross-sectional view of another embodiment of the underwater data interface of the invention.

FIG. 2 shows flat optical plate members 60, 70 can be formed as tapered flat discs 22A, 32A of strong optically transparent materials having tapered ends 22AA, 32AA shaped to fit into tapered openings 23, 33 as described with respect to sectors 22, 32 above, and can include adhesives 24, 34 and O-rings 25, 35. Tapered flat discs 22A, 32A have protrusions 106, 107 facing mating, correspondingly disposed cavities 108, 109 molded inwardly from and along their peripheries (only one protrusion 106 and one cavity 109 for sector 22A and one protrusion 107 and one cavity 108 for sector 32A are shown, it being understood that many projections and cavities can be molded along the peripheries of arc-shaped sectors 22A, 32A). Protrusions 106, 107 nestle, or mate into cavities 108, 109 when flat discs 22A, 32A are brought together to optically align and separate flat discs 22A, 32A and create layer 12 of water 1 in between. Light passing between vessels 20 and 30 through optically aligned discs 22C, 32C is not refracted or otherwise distorted appreciably.

Referring to FIG. 1, optical transceivers 80 and 90 of underwater data interface 10 are each respectively coupled to a conductor 46 or 56 that each respectively extends from module 45 or 55. Transceiver 80 generates optical data signals (shown as arrow 82) from electronic data signals 40, and transceiver 90 generates optical data signals (shown as arrow 92) from electronic data signals 50. Transceiver 80 is mounted or placed adjacent to optical plate 60 for transmitting optical data signals 82 through optical plate 60 and from vessel 20. Transceiver 90 is mounted or placed adjacent to optical plate 70 for transmitting optical data signals 92 through optical plate 70 and from vessel 30. Optical data signals 82, 92 can be transmitted and received at high speed to reduce the time for transferring their information.

Pressure vessels 20 and 30 are brought close together and protrusions 102, 103 nestle in cavities 104, 105 to separate optical plates 60 and 70 by an essentially optically transparent thin layer 12 of ambient water 11. Thin layer 12 transmits optical data between pressure vessels 20, 30. Water 11 of layer 12 fills any scratches that may be present on exposed surfaces of optical plates 60, 70 and prevents them from causing unwanted diffraction of the light of the optical data signals. Any refraction of the light of the optical data signals as they pass from either of transceivers 80 or 90 into water 11 of layer 12 is essentially cancelled out as the light of the optical data signals passes from water 11 of layer 12 to the other one of transceivers 80 or 90.

Optical transceiver 80, optical plate 60, thin water layer 12, optical plate 70 and optical transceiver 90 are virtually optically aligned by the mating protrusions and cavities described above. Optical data signals are therefore transmitted and received between transceivers 80 or 90 as if a conventional fiber optic cable connected the two transceivers; however, the disadvantages of actually having such a fiber optic cable do not need to be tolerated.

Optical data signals 82 from optical transceiver 80 pass through optical plate 60, through water layer 12, through optical plate 70 and to optical transceiver 90. Transceiver 90 converts or regenerates optical data signals 82 into electronic data signals (shown as arrow 94) that are fed to module 55. Opt cal data signals 92 from optical transceiver 90 pass through optical plate 70, through water layer 12, through optical plate 60 and to optical transceiver 80. Transceiver 80 converts or regenerates optical data signals 92 into electronic data signals (shown as arrow 84) that are fed to module 45. Electronic modules 45 and 55 can store the information of electronic data signals 84, 94 and transfer the information to other vessels and/or make use of it as needed.

In other words during operation, electronics module 45 connects first electronic data signals 40 to optical transceiver 80 and receives regenerated second electronic data signals 84 from first optical transceiver 80; electronics module 55 connects second electronic data signals 50 to optical transceiver 90 and receives regenerated first electronic data signals 94 from optical transceiver 90; optical transceiver 80 generates first optical data signals 82 from first electronic data signals 40 and transmits first optical data signals 82 through transparent plate 22, water layer 12, and transparent plate 32; optical transceiver 90 generates second optical data signals 92 from second electronic data signals 50 and transmits second optical data signals 92 through transparent plate 32, water layer 12, and transparent plate 22; optical transceiver 80 receives second optical data signals 92 from optical transceiver 90, regenerates second electronic data signals 84 therefrom and couples the regenerated second electronic data signals 84 to electronics module 45; and optical transceiver 90 receives optical data signals 82 from optical transceiver 80, regenerates first electronic data signals 94 therefrom, and couples the regenerated first electronic data signals 94 to electronics module 55. Optical transceiver 80, optical plate 60, optical plate 70 and optical transceiver 90 are optically aligned by the protrusions and cavities, and optical data signals are accurately transferred.

The electronic and optical data signals referred to herein are most likely to be digital. But, if electronic and/or optical analog signals are to be utilized, appropriate analog to digital and digital to analog converters can be included in electronics modules 45, 55 and means for storing analog data must be provided to assure compatibility and successful transfer of data between vessels 20, 30 and where otherwise needed.

Figure 3:
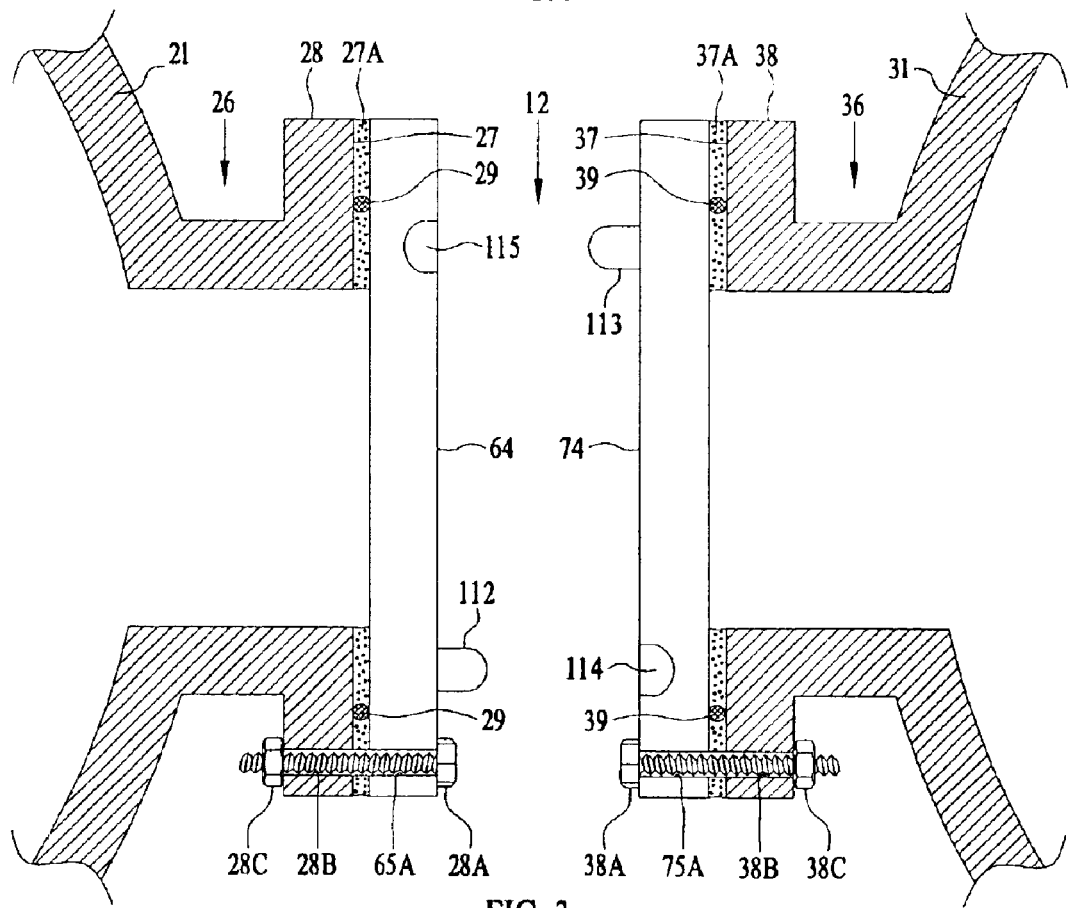
FIG. 3 is a schematic cross-sectional view of another embodiment of the underwater data interface of the invention.

FIG. 3 shows flat plate-like members 64 and 74 of optically transparent material in another embodiment of underwater data interface 10. Flat plate members 64 and 74 have an outer ring-shaped portion 65 and 75, respectively, and flange structures 26 and 36 outwardly extend from pressure hulls 21 and 31, respectively. Flange structures 26 and 36 have outer annular surfaces 27 and 37 on outer annular members 28, 38, respectively. Annular surfaces 27 and 37 can be bonded onto ring-shaped portions 65 and 75 with an adhesive 27A and 37A to provide a secure watertight fitting. Optionally, ring shaped portions 65, 75 can have holes 65A, 75A receiving threaded bolts 28A and 38A through them and holes 28B and 38B in annular members to engage threaded nuts 28C and 38C adjacent outer annular members 28 and 38 to further secure flat plates 64 and 74 onto flange structures 26 and 36 and to compress O-rings 29 and 39 between flat plates 64 and 74 and annular surfaces 27 and 37 on outer annular members 28, 38 of flange structures 26, 36, respectively. Only one bolt 28A on annular member 28 and one bolt 38A on annular member 38 is shown, it being understood that a plurality of such bolts can be provided around annular members 28, 38 as desired.

Flat plates 64 and 74 secured to flange structures 26 and 36 can be transparent observation ports for human operators or used to gather optical data for optical instrumentation in vessels 20, 30. Flat plates 64 and 74 serve as vital, integral parts of hulls 21, 31 that create watertight integrity of pressure vessels 20 and 30. In accordance with this invention flat plates 64, 74 additionally function as conduits for optical data as described above with respect to optical transceivers 80, 90 and their associated components. Vessels 20 and 30 only need to be maneuvered to be close together and separated by an optically transparent thin layer 12 of ambient water 11 between flat plates 64 and 74 to allow the transfer of data as described above. Mating protrusions 112, 113 and cavities 114, 115 are included to assure optical alignment and separation of plates 64, 74 for creating layer 12 as described above.

Figure 4:
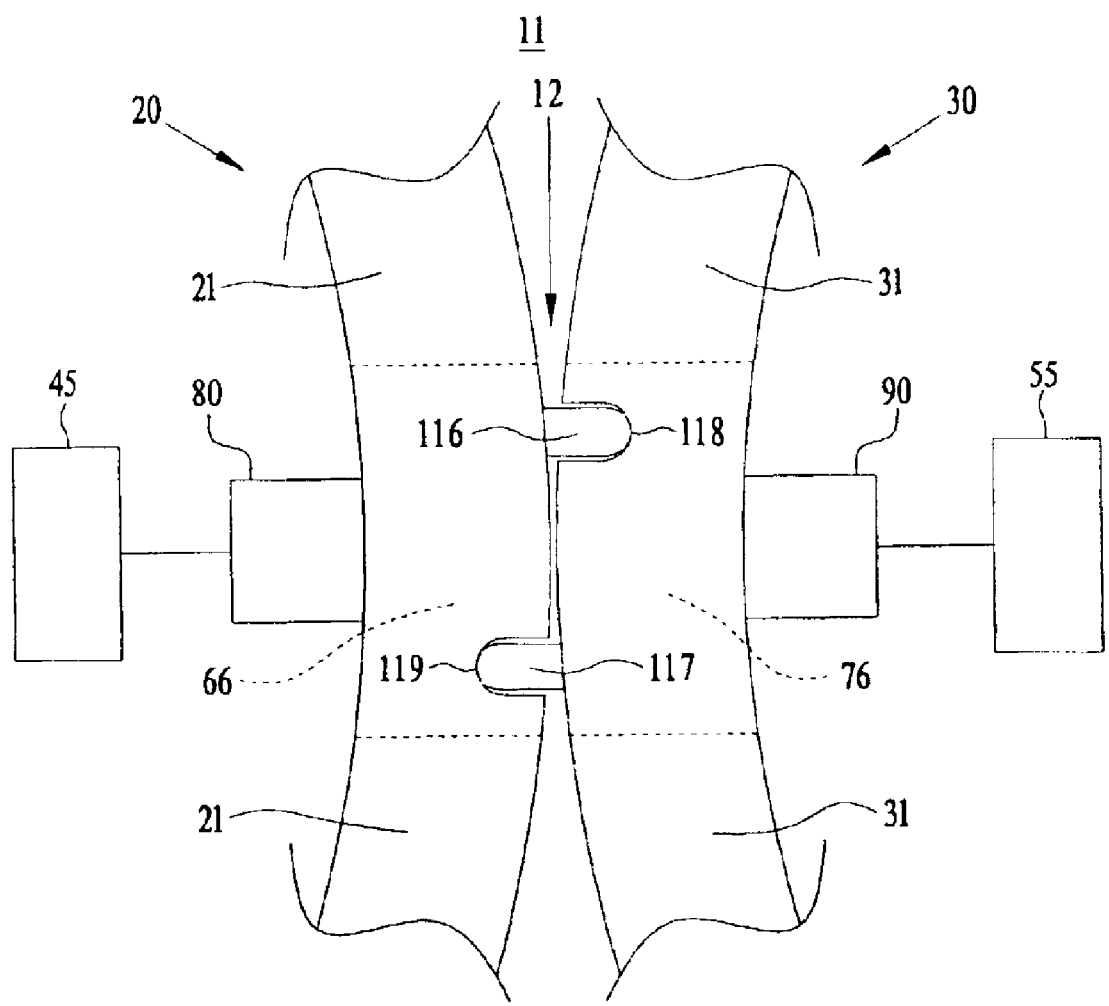
FIG. 4 is a schematic cross-sectional view of another embodiment of the underwater data interface of the invention.

FIG. 4 shows another embodiment of underwater data interface 10 that uses integral parts of pressure hulls 21 and 31 to transfer data. In this embodiment pressure hulls 21 and 31 are made from clear glass, polycarbonate, acrylic, or other sophisticated high-strength, rigid, plastic-like fabrication materials instead of opaque metals. This construction creates spherical shell-shaped sectors, or sector-shaped plate sections 66 and 76 that are coextensive integral parts of rounded hulls 21 and 31, respectively. Thus, spherical shell-shaped sectors 66 and 76 serve as vital, integral parts of hulls 21 and 31 that create watertight integrity of pressure vessels 20 and 30. In accordance with this invention spherical shell-shaped sectors 66, 76 also serve as conduits for optical data as described above with respect to optical transceivers 80, 90 and their associated components. When vessels 20 and 30 come close together with only thin layer 12 of optically transparent water 11 between them, optical data can be passed between them as described above. Mating protrusions 116, 117 and cavities 118, 119 are included to assure optical alignment and separation of sectors 66, 76 and creation of layer 12 as described above.

Having the teachings of this invention in mind, modifications and alternate embodiments of underwater data interface 10 may be adapted without departing from the scope of the invention. Underwater data interface 10 can be made larger or smaller in different shapes and fabricated from a wide variety of materials to assure resistance to corrosion and sufficient strength for long-term reliable operation under a multitude of different operational requirements. Its uncomplicated, compact design incorporates structures and technologies long proven to operate successfully underwater. Therefore, data interface 10 is fully capable of providing a high-speed optical data aperture for many other purposes to perform highly satisfactorily on land or in space. In addition, data interface 10 of the invention can provide for virtually undetectable high-speed transfer of optical data and allows one or the other of vessels 20, 30 to withdraw with the data to a distant base while the other remains on station and collects more data.

The disclosed components and their arrangements as disclosed herein, all contribute to the novel features of this invention. Underwater data interface 10 assures reliable data transfer irrespective of ambient conditions. Therefore, underwater data interface 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An optical data interface between vessels comprising:

a first vessel;

a second vessel;

a first plate transparent to optical data on said first vessel;

a first optical transceiver in said first vessel, said first optical transceiver being adjacent to said first transparent plate;

a second plate transparent to optical data on said second vessel;

a second optical transceiver in said second vessel, said second optical transceiver being adjacent to said second transparent plate; and protrusions and cavities on said first and second plates, individual ones of said protrusions facing and nestling in correspondingly disposed ones of said cavities to optically align said plates.

2. The interface of claim 1 further comprising:

a layer of water between said first plate and said second plate, said layer of water being optically transparent to optical data.

3. The interface of claim 2 wherein said protrusions nestling in said cavities create a space for said layer, and said first optical transceiver and said second optical transceiver transmit and receive optical data through said first transparent plate, said water layer, and said second transparent plate.

4. The interface of claim 3 wherein said first transparent plate is an integral part of a pressure hull of said first vessel to create watertight integrity thereof and a conduit of optical data, and said second transparent plate is an integral part of a pressure hull of said second vessel to create watertight integrity thereof and a conduit of optical data.

5. The interface of claim 4 further comprising:
a first electronics module connected to said first optical transceiver in said first vessel; and
a second electronics module connected to said second optical transceiver in said second module.

6. The interface of claim 5 wherein said first electronics module connects first electronic data signals to said first optical transceiver and receives regenerated second electronic data signals from said first optical transceiver, and said second electronics module connects second electronic data signals to said second optical transceiver and receives regenerated first electronic data signals from said second optical transceiver.

7. The interface of claim 6 wherein said first optical transceiver generates first optical data signals from said first electronic data signals and transmits said first optical data signals through said first transparent plate, said water layer, and said second transparent plate, and said second optical transceiver generates second optical data signals from said second electronic data signals and transmits said second optical data signals through said second transparent plate, said water layer, and said first transparent plate.

8. The interface of claim 7 wherein said first optical transceiver receives said second optical data signals from said second optical transceiver, regenerates said regenerated second electronic data signals therefrom and couples said regenerated second electronic data signals to said first electronics module, and said second optical transceiver receives said first optical data signals from said first optical transceiver, regenerates said regenerated first electronic data signals therefrom, and couples said regenerated first electronic data signals to said second electronics module.

9. The interface of claim 8 wherein said pressure hulls of said first and second vessels are opaque and said first plate and said second plate are transparent arc-shaped sectors to fit into correspondingly-shaped tapered openings in said pressure hulls and extend coextensively in said pressure hulls.

10. The interface of claim 9 further comprising:
adhesives and O-rings between said arc-shaped sectors and said tapered openings for securing and sealing these joints.

11. The interface of claim 8 wherein said pressure hulls of said first and second vessels are opaque and said first plate and said second plate are transparent flat discs to fit into correspondingly-shaped tapered openings in said pressure hulls and extend in said pressure hulls.

12. The interface of claim 11 further comprising:
adhesives and O-rings between said flat discs and said tapered openings for securing and sealing these joints.

13. The interface of claim 12 wherein said first and second plates are flat and have outer ring-shaped portions, and said pressure hulls have outwardly extending flange structures bonded to said ring shaped portions with an adhesive to provide a secure watertight fitting.

14. The interface of claim 13 further comprising:
bolts extending through said ring-shaped portions to engage threaded bores in said flange structures to further secure said first and second flat plates onto said flange structures; and
O-rings between said first and second flat plates and said flange structures.

15. The interface of claim 8 wherein said pressure hulls are made from clear material, and said first and second plates are transparent spherical shell-shaped sectors of said pressure hulls and coextensive integral parts thereof.

* * * * *